US012632089B2

(12) United States Patent
Lee et al.

(10) Patent No.: US 12,632,089 B2
(45) Date of Patent: May 19, 2026

(54) FLEXIBLE DISPLAY PANEL AND ELECTRONIC DEVICE

(71) Applicant: Samsung Electronics Co., Ltd., Suwon-si (KR)

(72) Inventors: Gae Hwang Lee, Suwon-si (KR); Youngjun Yun, Suwon-si (KR); Hyun Bum Kang, Suwon-si (KR); Jong Won Chung, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 449 days.

(21) Appl. No.: 18/175,962

(22) Filed: Feb. 28, 2023

(65) Prior Publication Data

US 2023/0341902 A1 Oct. 26, 2023

(30) Foreign Application Priority Data

Apr. 20, 2022 (KR) ........................ 10-2022-0049004

(51) Int. Cl.
*G06F 1/16* (2006.01)

(52) U.S. Cl.
CPC .................................. *G06F 1/1652* (2013.01)

(58) Field of Classification Search
CPC ................ G06F 1/1652; H10K 59/125; H10K 2102/311; H10K 59/123; G09F 9/301
See application file for complete search history.

(56) References Cited

U.S. PATENT DOCUMENTS 9,401,485 B2 7/2016 Deng et al.
10,985,214 B2 4/2021 Tian
2016/0211472 A1* 7/2016 Oh ....................... H10D 86/411
2018/0197931 A1 7/2018 Liang et al.
2019/0073946 A1 3/2019 Su (Continued)

FOREIGN PATENT DOCUMENTS

JP 2021026094 A * 2/2021
KR 101551823 B1 9/2015
KR 10-2021-0116061 A 9/2021

OTHER PUBLICATIONS

Translation JP 2021026094 A (Year: 2021).*

(Continued)

*Primary Examiner* — Yara B Green
*Assistant Examiner* — Coralie A Nettles
(74) *Attorney, Agent, or Firm* — Harness, Dickey & Pierce, P.L.C.

(57) ABSTRACT

Provided are a flexible display panel and an electronic device including the same, in the flexible display panel that is foldable, bendable, or rollable along at least one axis extending in a first direction, the flexible display panel including a substrate including a stretchable region and a non-stretchable region, a plurality of pixel circuits repeatedly arranged on the substrate, and a unit element array including unit elements repeatedly arranged on the substrate and electrically connected to each of the pixel circuits, wherein each of the pixel circuits includes a plurality of thin film transistors, the plurality of thin film transistors include a first thin film transistor on the stretchable region of the substrate, and a channel length direction of the first thin film transistor is substantially parallel to the first direction flexible display panel.

20 Claims, 13 Drawing Sheets

(56) References Cited

U.S. PATENT DOCUMENTS

| | | | | |
|---|---|---|---|---|
| 2021/0217976 | A1* | 7/2021 | Min | G09F 9/301 |
| 2021/0313527 | A1* | 10/2021 | Hong | H10K 59/131 |
| 2021/0367169 | A1 | 11/2021 | Wu | |
| 2022/0075419 | A1* | 3/2022 | Nomoto | G09F 9/30 |
| 2022/0217840 | A1* | 7/2022 | Park | G06F 3/0412 |

OTHER PUBLICATIONS

JP 2021026094 A Translation (Year: 2021).*

Extended European Search Report issued Jun. 23, 2023 in European Application No. 23167344.3.

Office Action issued Nov. 14, 2025 in Korean Application No. 10-2022-0049004.

* cited by examiner

FLEXIBLE DISPLAY PANEL AND ELECTRONIC DEVICE

CROSS-REFERENCE TO RELATED APPLICATION

This application claims priority to and the benefit of Korean Patent Application No. 10-2022-0049004 filed in the Korean Intellectual Property Office on Apr. 20, 2022, the entire contents of which are incorporated herein by reference.

BACKGROUND

1. Field

A flexible display panel and an electronic device are disclosed.

2. Description of the Related Art

Recently, electronic devices, including flexible display panels, have become commercially available. Accordingly, research on a foldable, bendable, or rollable display panel effectively applicable to a portable electronic device, such as a mobile phone, or advantageously usable for space utilization is in progress.

SUMMARY

A flexible display panel which is foldable, bendable, or rollable in a such as the foldable, bendable, or rollable display panel, which, since stress may be concentrated in a specific region thereof, may have structural and functional deformation and damage in the region where such stress is concentrated, resulting in deteriorating display quality.

Some example embodiments provide a flexible display panel configured to reduce the structural and functional deformation and damage as well as securing flexibility and thus preventing the deterioration of display quality.

Some example embodiments provide an electronic device including the flexible display panel.

The flexible display panel, according to some example embodiments, configured to be at least one of foldable, bendable, or rollable along at least one axis extending in a first direction includes: a substrate comprising at least one stretchable region and at least one stretch-resistant region, a plurality of pixel circuits repeatedly arranged on the substrate, and a light emitting element array comprising light emitting elements repeatedly arranged on the substrate and electrically connected to a corresponding pixel circuit, of the plurality of pixel circuits, wherein each of the pixel circuits includes a plurality of thin film transistors, each of the plurality of thin film transistors includes a first thin film transistor on the stretchable region of the substrate, and a channel length direction of the first thin film transistor is substantially parallel to the first direction.

The light emitting element may be on the stretch-resistant region of the substrate.

The light emitting element may include a light emitting diode.

The plurality of thin film transistors may further include a second thin film transistor on the stretch-resistant region of the substrate.

The first thin film transistor may be a switching thin film transistor, and the second thin film transistor may be a driving thin film transistor.

The first thin film transistor may include a stretchable semiconductor layer, and the second thin film transistor may include a non-stretchable semiconductor layer.

The stretchable semiconductor layer may include an organic semiconductor, an oxide semiconductor, or a combination thereof, and the stretch-resistant semiconductor layer may include an elemental semiconductor, an oxide semiconductor, or any combination thereof.

The stretchable semiconductor layer may further include an elastomer.

The flexible display panel may include a deformation section in which the flexible display panel is foldable, bendable, rollable, or a combination thereof along the axis and a non-deformation section excluding the deformation section, and the deformation section may include the stretchable region and the stretch-resistant region.

In the deformation section, the stretchable region and the stretch-resistant region of the substrate may be alternately disposed along the first direction.

In the non-deformation section, the substrate may not include the stretchable region.

The stretchable region may have at least one of an island shape or a stripe shape, and the stretch-resistant region may be a region excluding the stretchable region.

The stretch-resistant region may have at least one of an island shape or a stripe shape, and the stretchable region may be a region excluding the non-stretchable region.

The stretchable region of the substrate may have a plurality of cut lines that are configured to be deformable by an external force.

An elastic modulus of the stretchable region of the substrate may be about 100 Pa to about $10^3$ Pa, and an elastic modulus of the non-stretchable region of the substrate may be about $10^5$ Pa to about $10^{12}$ Pa.

The stretchable region of the substrate may include at least one of a polyorganosiloxane, a polymer including a butadiene moiety, a polymer including a urethane moiety, a polymer including an acrylic moiety, or a polymer including an olefin moiety, and the non-stretchable region may include at least one of polycarbonate, polymethylmethacrylate, polyethyleneterephthalate, polyethylenenaphthalate, polyimide, polyamide, polyamideimide, or polyethersulfone.

The flexible display panel may further include a connection wire electrically connecting the unit element and the first thin film transistor, and the connection wire may be a stretchable electrode.

The flexible display panel, according to some example embodiments, includes a deformation section in which the flexible display panel is foldable, bendable, or rollable along at least one axis extending in a first direction, and a non-deformation section excluding the deformation section, wherein the deformation section includes a stretchable region and a stretch-resistant region, the stretchable region includes a first thin film transistor including a stretchable semiconductor layer, and the stretch-resistant region includes a light emitting diode.

A channel length direction of the first thin film transistor may be substantially parallel to the first direction.

The non-stretchable region may further include at least one of a capacitor or a second thin film transistor including a non-stretchable semiconductor layer.

The first thin film transistor may be a switching thin film transistor, and the second thin film transistor may be a driving thin film transistor.

The stretchable region and the stretch-resistant region within the deformation section may be alternately disposed along the first direction.

The stretchable region and the stretch-resistant region within the deformation section may be alternately disposed along a second direction perpendicular to the first direction.

The non-deformation section may not include the stretchable region.

The flexible display panel may further include a connection wire electrically connecting the first thin film transistor and the light emitting element, and the connection wire may be a stretchable electrode.

According to another embodiment, an electronic device including the flexible display panel is provided.

The foldable section, bendable section, or rollable section of a flexible display panel such as a foldable display panel, a bendable display panel or a rollable display panel, structural damage caused by stress may be reduced, deterioration of display quality may be prevented, and a flexible display panel of a smaller curvature may be implemented.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
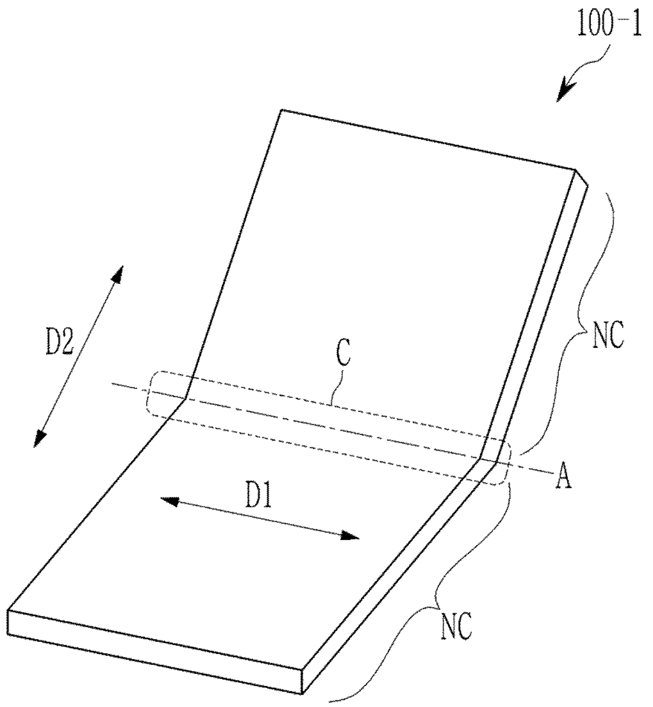
FIGS. 1 to 4 are schematic views, each showing examples of a flexible display panel according to some example embodiments.

Hereinafter, implementation examples will be described in detail so that those of ordinary skill in the art can easily implement them. However, the structure that is actually applied may be implemented in various different forms and is not limited to the example embodiments described herein and wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. Terms such as "first", "second", "third", and the like may be used to describe various components but are used only for the purpose of distinguishing one component from other components, and the order, type, and/or the like of the components are not limited.

In the drawings, the thickness of layers, films, panels, regions, etc., may be exaggerated for clarity. When the terms "about" are used in this specification in connection with a numerical value, it is intended that the associated numerical value includes a manufacturing tolerance (e.g., ±10%) around the stated numerical value. Further, regardless of whether values are modified as "about" or "substantially," it will be understood that these values should be construed as including a manufacturing or operational tolerance (e.g., ±10%) around the stated values.

It will be understood that when an element such as a layer, film, region, or substrate is referred to as being "on" and/or "above" another element, it may be directly on the other element or intervening elements may also be present. In contrast, when an element is referred to as being "directly on" and/or "directly above" another element, there are no intervening elements present.

Hereinafter, "combination" includes a mixture, a composite, or a stacked structure of two or more.

Hereinafter, a flexible display panel according to some example embodiments is described with reference to the drawings.

The flexible display panel according to some example embodiments may be a display panel that can be flexibly deformed by a user or by an external force by introducing a structurally deformable portion into a screen for displaying an image. For example, the flexible display panel may include a foldable display panel configured to fold into one, two, or more screens along a predetermined direction, a bendable display panel configured to bend the screen along a predetermined direction, and/or a rollable display panel configured to roll the screen along a predetermined direction.

FIGS. 1 to 4 are schematic views, each showing examples of a flexible display panel according to some example embodiments.

Figure 2:
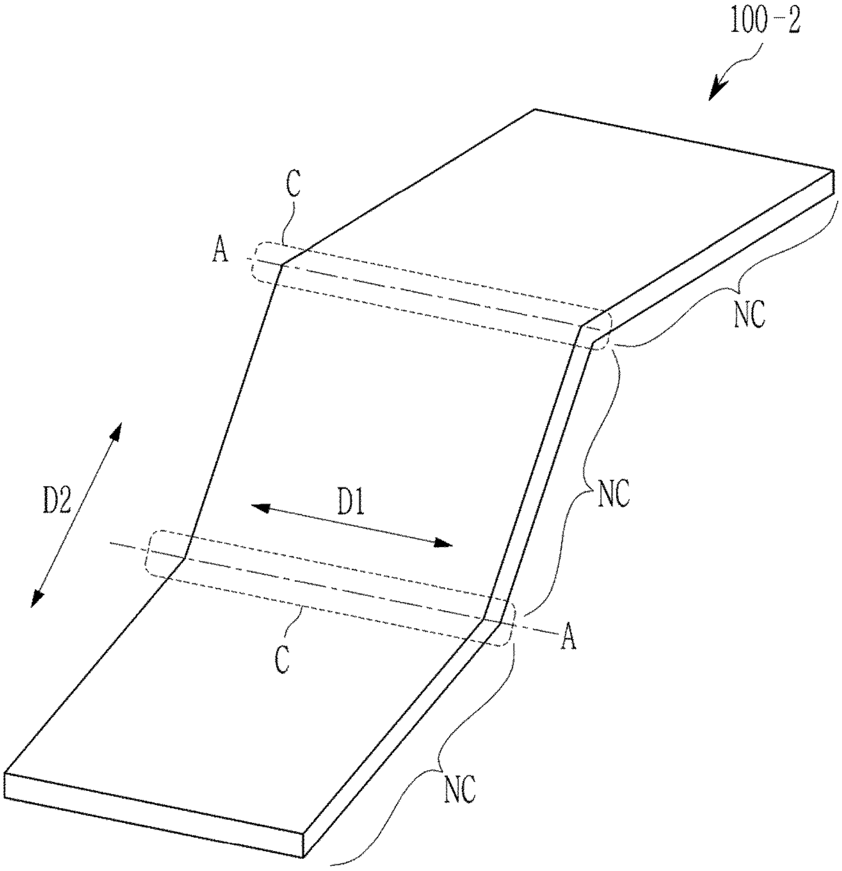
Figure 3:
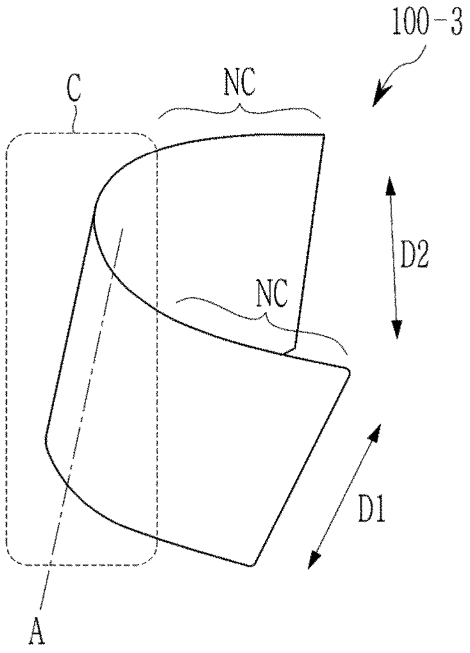
Figure 4:
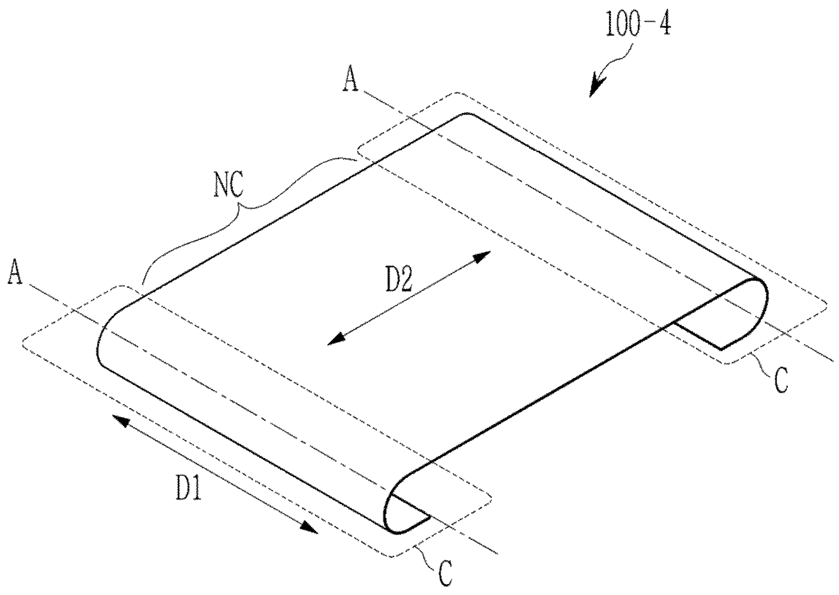

The flexible display panel 100, according to some example embodiments, may include a foldable display panel, (such as examples 100-1 and 100-2 illustrated in FIGS. 1 and 2), a bendable display panel (such as example 100-3 illustrated in FIG. 3), and/or a rollable display panel (such as example 100-4 illustrated in FIG. 4). The foldable display panel shown in FIG. 1 is a single-axis foldable display panel that can fold the screen along one axis A, and the foldable display panel shown in FIG. 2 is a multi-axis foldable display panel that can fold the screen along two axes A. However, the number of axes A is not limited thereto and may be, e.g., three or more. FIG. 1 illustrates an in-folding configuration in which the screen is foldable inward, but the present disclosure is not limited thereto, and may be similarly applied to an out-folding configuration in which the screen is foldable outward.

Referring to FIGS. 1 to 4, the flexible display panel 100 may be foldable, bendable, or rollable along at least one axis A extending in the first direction D1, respectively. The flexible display panel 100 may include a deformation section C that is foldable, bendable, and/or rollable along an axis A and a non-deformation section NC excluding the deformation section C.

Each of the deformation sections C may be a foldable section, a bendable section, or a rollable section that is deformable in a curve in the center of the axis A and may be included once, twice, or more in the flexible display panel 100. The deformation section C may be a region that can define a radius of curvature, which refers to a degree to which it is foldable, bendable, or rollable up to the maximum without substantial damage, and may be a region where stress is concentrated when repeatedly folded, bent, or rolled. The flexible display panel 100 may be configured such that the primary direction of stress acting on the deformation section C is a direction that is repeatedly folded, bent, or rolled, for example, a second direction D2 substantially perpendicular to the first direction D1. The non-deformation section NC may be a flat section or a section in which stress is relatively lower than that of the deformation section C, but the example embodiments are not limited thereto.

Figure 5:
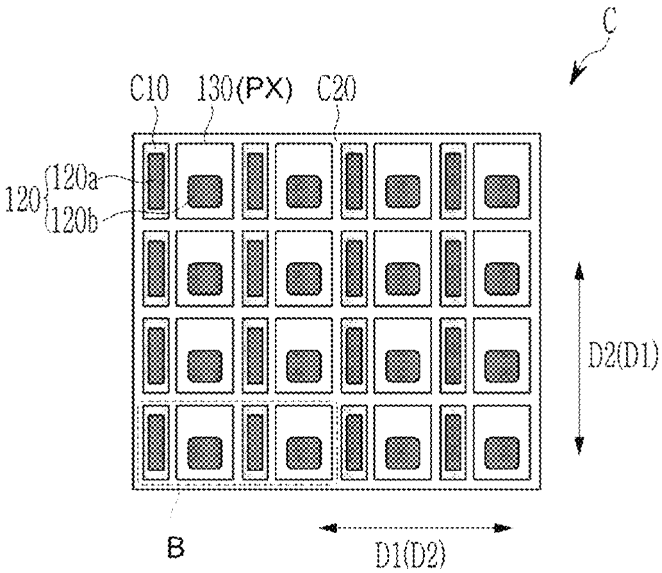
FIG. 5 is an enlarged plan view of a deformation section C of the flexible display panel of FIGS. 1 to 4.
Figure 6:
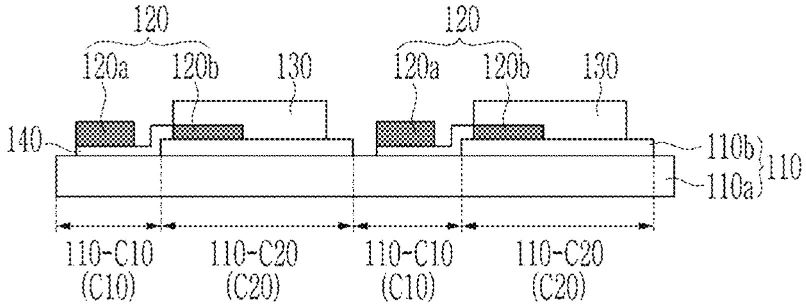
FIG. 6 is a cross-sectional view of part B of FIG. 5.
Figure 7:
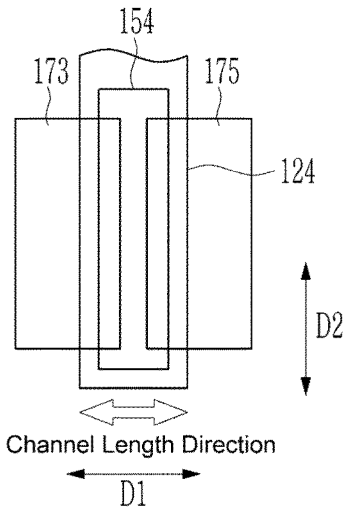
FIG. 7 is a plan view illustrating an example of a first thin film transistor disposed in a stretchable region of the flexible display panel of FIGS. 5 and 6.
Figure 8:
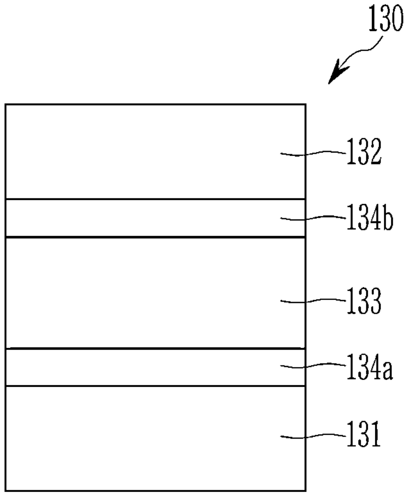
FIG. 8 is a cross-sectional view illustrating an example of a unit element disposed in a non-stretchable region of a flexible display panel.

FIG. 5 is an enlarged plan view of a deformation section C of the flexible display panel of FIGS. 1 to 4, FIG. 6 is a cross-sectional view of part B of FIG. 5, FIG. 7 is a plan view illustrating an example of a first thin film transistor disposed in a stretchable region of the flexible display panel of FIGS. 5 and 6, and FIG. 8 is a cross-sectional view illustrating an example of a unit element disposed in a non-stretchable region of a flexible display panel.

Referring to FIG. 5, the deformation section C of the flexible display panel 100 includes a stretchable region C10 and a stretch-resistant region C20.

The stretchable region C10 is a region that can flexibly respond to external forces such as twisting, pressing, and pulling and provides stretchability to the deformation section C of the flexible display panel 100, and stress applied when repeatedly folded, bent, and/or rolled can be lowered, thereby reducing or preventing damage in the deformation section C.

For example, the stretchable region C10 may have an island shape, a stripe shape, and/or any combination thereof, and may have, for example, a matrix arrangement repeatedly arranged along rows and/or columns. However, the example embodiments are not limited thereto, and the stretch-resistant regions C20 may be island-shaped, straight-shaped, or any combination thereof, and the stretchable regions C10 may be connected to each other in regions excluding the stretch-resistant region C20. The stretchable region C10 may include a stretchable material having a relatively low elastic modulus, wherein the elastic modulus may be Young's modulus.

The stretch-resistant region C20 is a region in which resistance to external forces such as twisting, pressing, and pulling is relatively high, so that it is not substantially deformed by an external force and/or the degree of deformation is very small, and may include a non-stretchable material having a relatively high elastic modulus. The stretch-resistant region C20 may include a region corresponding to pixels or subpixels (PXs) that display colors in the flexible display panel 100 and may include a part of the pixel circuit 120 and/or unit elements 130 to be described later.

For example, the elastic modulus of the stretch-resistant region C20 (elastic modulus of the non-stretchable material included in the stretch-resistant region C20) may be at least 100 times higher than the elastic modulus of the stretchable region C10 (the elastic modulus of the stretchable material included in the stretchable region C10), and within the above range, about 200 times or more, about 300 times or more, about 500 times or more, or about 1000 times or more, and within the above range, about 100 times to about $10^8$ times, about 200 times to about $10^8$ times, about 300 to about $10^8$ times, about 500 to about $10^8$ times, and/or about 1000 to about $10^8$ times higher. For example, the elastic modulus of the stretchable region C10 may be about 100 to about $10^3$ Pascals (Pa) and the elastic modulus of the stretch-resistant region C20 may be about $10^5$ Pa to about $10^{12}$ Pa but is not limited thereto.

In the deformation section C of the flexible display panel 100, the stretchable region C10 and the Pa stretch-resistant region C20 may be alternately disposed along at least one direction. For example, the stretchable region C10 and the non-stretchable region 20 may be alternately disposed along the first direction D1 and/or for example, the stretchable region C10 and the non-stretchable region 20 may be alternately disposed along the second direction D2 perpendicular to the first direction D1. For example, the stretchable region C10 and the non-stretchable region 20 may be alternately disposed in the first direction D1 and the second direction D2.

Referring to FIGS. 5 and 6, the deformation section C of the flexible display panel 100 according to some example embodiments includes a substrate 110, a plurality of pixel circuits 120 repeatedly arranged on the substrate 110, and a plurality of unit elements 130 and connection wire 140 repeatedly arranged on the substrate 110.

The substrate 110 may be a flexible substrate having a predetermined (and/or otherwise determined) flexibility and/or a stretchable substrate having a predetermined (and/or otherwise determined) stretchability. The substrate 110 may include a flexible and/or stretchable material and a stretch resistant material. For example, the substrate 110 may include, for example, a polymer (including organic/inorganic polymer), an inorganic elastomer-like material, any combination thereof, and/or the like. The polymer may include, for example, at least one of polycarbonate, polymethylmethacrylate, polyethyleneterephthalate, polyethylenenaphthalate, polyimide, polyamide, polyamideimide, polyethersulfone, a substituted or unsubstituted polyorganosiloxane (such as polydimethylsiloxane), a polymer including a substituted or unsubstituted butadiene moiety (such as styrene-ethylene-butylene-styrene), a polymer including a urethane moiety, a polymer including an acrylic moiety, a polymer including an olefin moiety, any combination thereof, and/or the like, but the example embodiments are not limited thereto. The inorganic elastomer-like material may include, but is not limited to, a ceramic having elasticity, a solid metal, a liquid metal, any combination thereof, and/or the like. The substrate 110 may have one layer, two layers, and/or more layers made of different materials.

The substrate 110 may include a stretchable region 110-C10 and a stretch-resistant region 110-C20. The stretchable region 110-C10 may correspond to the stretchable region C10 of the aforementioned flexible display panel 100 and the stretch-resistant region 110-C20 may correspond to the stretch-resistant region C20 of the aforementioned flexible display panel 100. For example, the stretchable region C10 and the stretch-resistant region C20 of the flexible display panel 100 may be determined by the stretchability of the substrate 110, and the elastic modulus of the stretchable region C10 and the stretch-resistant region C20 of the flexible display panel 100 may be determined by the elastic modulus of the stretchable region 110-C10 and the stretch-resistant region 110-C20 of the substrate 110.

For example, the elastic modulus of the stretch-resistant region 110-C20 of the substrate 110 may be at least 100 times higher than the elastic modulus of the stretchable region 110-C10 of the substrate 110, within the above range, about 200 times or more, about 300 times or more, about 500 times or more, or about 1000 times or more, within the above range about 100 times to about $10^8$ times, about 200 times to about $10^8$ times, about 300 times to about $10^8$ times, about 500 times to about $10^8$ times, or about 1000 times to about $10^8$ times higher. For example, the elastic modulus of the stretchable region 110-C10 of the substrate 110 may be about 100 Pa to about $10^3$ Pa, and the elastic modulus of the stretch-resistant region 110-C20 of the substrate 110 may be about $10^5$ Pa to about $10^{12}$ Pa, but, the example embodiments are not limited thereto.

For example, the stretchable regions 110-C10 of the substrate 110 may include the stretchable substrate 110*a* including a stretchable material having a relatively low elastic modulus. The stretchable material may include, for example, a polyorganosiloxane, a polymer including a butadiene moiety, a polymer including a urethane moiety, a polymer including an acrylic moiety, a polymer including an olefin moiety, any combination thereof, and/or the like. For example, the stretchable material may include, for example, at least one of polydimethylsiloxane (PDMS), thermoplastic polyurethane (TPU), styrene-ethylene-butylene-styrene (SEBS), styrene-ethylene-propylene-styrene (SEPS), styrene-butadiene-styrene (SBS), styrene-isoprene-styrene (SIS), styrene-isobutylene-styrene (SIBS), and/or any combination thereof, but is not limited thereto.

For example, the stretch-resistant regions 110-C20 of the substrate 110 may include a flexible substrate 110*b* including a flexible material having a relatively high elastic modulus. The flexible material may include, for example, polycarbonate, polymethylmethacrylate, polyethyleneterephthalate, polyethylenenaphthalate, polyimide, polyamide, polyamide-imide, polyethersulfone, and/or any combination thereof, but is not limited thereto.

For example, as shown in FIG. 6, the stretch-resistant region 110-C20 of the substrate 110 may be formed by stacking a flexible substrate 110*b* having a high elastic modulus on the stretchable substrate 110*a*. The substrate 110 of this stacked structure may be, for example, formed by forming the flexible substrate 110*b* on the stretchable substrate 110*a*, removing the flexible substrate 110*b* of the portion corresponding to the stretchable region 110-C10 (for example, by etching, and leaving the flexible substrate 110*b* alone in a portion corresponding to the stretchable region 110-C20). In this case, the elastic modulus of the stretch-resistant regions 110-C20 of the substrate 110 may be determined by a flexible material having a high elastic modulus.

However, the stretch-resistant regions 110-C20 of the substrate 110 may be formed in various ways without being limited to the substrate 110 having the stacked structure shown in FIG. 6.

For example, the stretch-resistant region 110-C20 of the substrate 110 may be formed by embedding a flexible material having a high elastic modulus in the stretchable substrate 110*a*. For example, in at least some example embodiments, the stretchable regions 110-C10 and the non-stretchable regions 110-C20 of the substrate 110 may be made based on the same polymer but may have different elastic modulus by varying conditions such as a degree of polymerization and/or a degree of curing. For example, the stretchable region 110-C10 and the stretch-resistant region 110-C20 of the substrate 110 may be formed by varying a polymerization degree, a type, and/or a content of the curing agent, and/or the curing temperature based on polydimethylsiloxane (PDMS).

For example, the stretchable regions 110-C10 and the stretch-resistant regions 110-C20 of the substrate 110 may be made of different polymers and include at least one structural unit in common. For example, the stretchable regions 110-C10 of the substrate 110 may include a first polymer, and the stretch-resistant regions 110-C20 of the substrate 110 may include a second polymer, and the first polymer and the second polymer may include at least one structural unit in common. The first polymer and the second polymer may each be, for example, a thermoplastic polymer. For example, the first polymer and the second polymer may include two types of structural units and may include one or two types of structural units in common. For example, the first polymer and the second polymer may include three types of structural units, and among them, may include one, two, or three types of structural units in common. As such, the first polymer and the second polymer may include at least one structural unit in common, and thus heterogeneity at the interface between the stretchable region 110-C10 and the stretch-resistant region 110-C20 of the substrate 110 may be reduced and adhesiveness of the interface between the stretchable region 110-C10 and the stretch-resistant region 110-C20 of the substrate 110 may be increased by chemical bonds such as crosslinks formed between the first and second polymers at temperatures above the glass transition temperature (Tg) or melting temperature (Tm) due to the thermoplastic properties of the first and second polymers.

The plurality of pixel circuits 120 are repeatedly arranged on the substrate 110. Each pixel circuit 120 may include elements necessary to independently control and/or to drive each pixel (or subpixel), and may include, for example, a plurality of thin film transistors TFTs, diodes, capacitors, and/or the like. The plurality of TFTs may include at least one switching TFT and at least one driving TFT.

The plurality of TFTs may be electrically connected to a signal line (not shown), and the signal line may include a gate line transmitting a gate signal (or a scan signal), a data line transmitting a data signal, and/or a driving voltage line transmitting a driving voltage. At least some of the plurality of signal lines may be stretchable wires.

At least some of the plurality of TFTs included in each pixel circuit 120 may be in the stretchable region C10. That is, at least some of the plurality of TFTs included in each pixel circuit 120 may be on the stretchable region 110-C10 of the substrate 110. As described above, by arranging at least some of TFTs in the stretchable region C10 in the deformation section C of the flexible display panel 100, compared to a structure in which all thin film transistors are disposed in the stretch-resistant region C20, an area occupied by TFTs in the pixel PX may be reduced, thereby overcoming the limitation of reducing the pixel size and, thus, effectively reducing the pixel size.

Specifically, as described above, since the deformation section C of the flexible display panel 100 has a separate stretchable region C10 for providing effective stretchability, compared to the non-deformation section NC of the substrate 110, the area occupied by the pixel PX is inevitably reduced. Meanwhile, in general, the size of the pixel PX cannot be smaller than the area occupied by the pixel circuit 120 in the pixel PX. In the present embodiment, to overcome this limitation, a portion of the pixel circuit 120 (e.g., at least a portion of TFTs) is arranged in the stretchable region C10 that is a region other than the pixel PX, and thereby, an area occupied by the pixel circuit 120 in the pixel PX may be effectively reduced, and a size of the pixel PX may also be effectively reduced. Accordingly, the limit of the area occupied by the pixel PX in the deformation section C of the flexible display panel 100 may be overcome, the size of the pixel PX may be effectively reduced, and the number of pixels PX per unit area may be increased, and thus substantially the same resolution as the non-deformation section NC may be implemented.

Therefore, by disposing the stretchable region C10 in a deformation region C such as a folding section, a bending section, or a rolling section of the flexible display panel 100 to reduce the stress applied when repeatedly folding, bending, or rolling the flexible display panel 100, damage in the deformation section C of the flexible display panel 100 may be reduced or prevented and at the same time, by disposing at least a portion of TFTs in the stretchable region C10, the pixel size may be effectively reduced and the number of pixels per unit area may be increased to achieve substantially the same resolution as the non-deformation section NC, and ultimately to provide uniform display quality over the entire screen without degrading the image quality in the deformation section (C) such as a folding section, a bending section, or a rolling section.

For example, the thin film transistor (hereinafter referred to as a "first thin film transistor") 120*a* disposed in the stretchable region C10 may be a stretchable thin film transistor including a stretchable semiconductor layer as an active layer. The stretchable semiconductor layer may include, for example, an organic semiconductor, and may include, for example, a low molecular semiconductor, a polymer semiconductor, any combination thereof, and/or the like. The stretchable semiconductor layer may include, for example, a semiconductor material and an elastomer. The elastomer may, for example, be selected to reduce the elastic modulus of the stretchable semiconductor layer. The semiconductor material may include, for example, an organic semiconductor, an oxide semiconductor, any combination thereof, and/or the like, and the elastomer may include, for example, polydimethylsiloxane (PDMS), styrene-ethylene-butyl Styrene-Styrene (SEBS), styrene-ethylene-propylene-styrene (SEPS), styrene-butadiene-styrene (SBS), styrene-isoprene-styrene (SIS), styrene-isobutylene-styrene (SIBS), and/or any combination thereof, but the present disclosure is not limited thereto.

As an example, referring to FIG. 7 together with FIG. 6, the first thin film transistor 120*a* may include a gate electrode 124, a stretchable semiconductor layer 154 overlapped with the gate electrode 124, a gate insulating layer (not shown) between the gate electrode 124 and the stretchable semiconductor layer 154, and a source electrode 173 and a drain electrode 175 electrically connected to the stretchable semiconductor layer 154, on a stretchable region 110-C10 of a substrate 110. The first thin film transistor 120*a* may have a bottom gate structure, a top gate structure, a bottom contact structure, and/or a top contact structure, but is not particularly limited. The gate electrode 124, the source electrode 173, and the drain electrode 175 may include, for example, a stretchable conductor, and the gate insulating layer may include, for example, a stretchable insulator. For example, at least one of the gate electrode 124, the source electrode 173, and/or the drain electrode 175 may be a stretchable electrode, wherein the stretchable electrode may include, for example, a stretchable conductor and/or may have a stretchable shape such as a wavy shape, a pleat shape, a pop-up shape, a non-planar mesh shape, and/or the like. The stretchable electrode may have, for example, a plurality of microcracks, and since the plurality of microcracks are separated from each other, flexibility may be provided to the stretchable electrode by extending along the stretching direction during stretching while maintaining the electrical movement path in the stretchable electrode.

The channel length direction of the first thin film transistor 120*a*(e.g., the direction from the source electrode 173 to the drain electrode 175) may be substantially parallel to the first direction D1 (e.g., the direction of the axis in which the flexible display panel 100 is configured to be folded, bent, or rolled). In other words, the channel length direction of the first thin film transistor 120*a* may be substantially perpendicular to the second direction D2, which is the direction of stress applied to the deformation section C of the flexible display panel 100. Herein, with regards to perpendicularity and/or relative orientation, "substantial" means about 0 degrees to ±about 10 degrees, about 0 degrees to ±about 7 degrees, about 0 degrees to ±about 5 degrees, about 0 degrees to ±about 3 degrees, about 0 degrees to about ±2 degrees, or about 0 degrees to ±about 1 degree in consideration of the potential error ranges.

In this way, by placing the channel length direction of the first thin film transistor 120*a* to be substantially parallel to the first direction D1 which is the direction of the axis of the deformation section C of the flexible display panel 100 and to be substantially perpendicular to the second direction D2 (which is the stress action direction) a change in the channel length by the strain may be effectively reduced when the flexible display panel 100 is folded, bent, or rolled. Therefore, even when the flexible display panel 100 is folded, bent, or rolled, a change in the current characteristics of the thin film transistor in the stretchable region C10 in the deformation section C may be reduced, thereby the flexible display panel 100 may exhibit stable electrical characteristics, and accordingly, a change in electrical characteristics in the deformation section C and thus deterioration of display quality may be effectively prevented.

The pixel circuit 120 excluding the first thin film transistor 120*a* may be disposed in the stretch-resistant region C20. In at least some example embodiments, the pixel circuit 120 in the stretch-resistant region C20 may include a thin film transistor (hereinafter referred to as a "second thin film transistor") 120*b* and/or a capacitor (not shown).

The second thin film transistor 120*b* may be a non-stretchable thin film transistor including a non-stretchable semiconductor layer as an active layer. The non-stretchable semiconductor layer may include, for example, an inorganic semiconductor layer and may include, for example, an elemental semiconductor (e.g., silicon), an oxide semiconductor, a combination thereof, and/or the like.

The first thin film transistor 120*a* and the second thin film transistor 120*b* may be a switching thin film transistor and/or a driving thin film transistor, respectively. The switching thin film transistor may be electrically connected to the gate line and the data line and may control the on/off of the pixel PX, and the driving thin film transistor may be electrically connected to the switching thin film transistor and the driving voltage line and may drive the pixel PX.

For example, the switching thin film transistor may include a first gate electrode electrically connected to the gate line; a first source electrode electrically connected to the data line; a first drain electrode facing the first source electrode; and a first semiconductor layer electrically connected to the first source electrode and the first drain electrode, respectively. For example, the driving thin film transistor may include a second gate electrode electrically connected to the first drain electrode; a second source electrode connected to the driving voltage line; a second drain electrode facing the second source electrode; a second semiconductor layer electrically connected to the second source electrode and the second drain electrode, respectively. The switching thin film transistor and the driving thin film transistor may include the same or different semiconductor layers.

In at least some embodiments, the switching thin film transistor may have low leakage current characteristics for high on/off characteristics. The switching thin film transistor may include an organic semiconductor layer, an oxide semiconductor layer, or a combination thereof having such low leakage current characteristics as the active layer and may be the first thin film transistor 120*a* including a stretchable semiconductor layer as described above. The driving thin film transistor may have high charge transfer characteristics. The driving thin film transistor may include a silicon semiconductor layer, an oxide semiconductor layer, or a combination thereof having such high charge transfer characteristics as the active layer and may be the second thin film transistor 120*b* including a non-stretchable semiconductor layer as described above.

However, the present disclosure is not limited thereto, and the first thin film transistor 120*a* may be a driving thin film transistor and the second thin film transistor 120*b* may be a switching thin film transistor. Also, the first thin film transistor 120*a* may be a switching thin film transistor and a driving thin film transistor, and the second thin film transistor 120*b* may be omitted.

The plurality of unit elements 130 are repeatedly arranged on the substrate 110, and each of unit elements 130 may define each pixel or subpixels PX of the flexible display panel 100. The plurality of unit elements 130 may be arranged, for example, along rows and/or columns to form a unit element array. The unit element array may be arranged, for example, in a Bayer matrix, a Pentile matrix, and/or a diamond matrix, similarly to the arrangement of the pixels or subpixels PX but is not limited thereto.

Each of the unit elements 130 may also be referred to as a light emitting element, and may be (or include), for example, a light emitting diode (LED), that independently displays red, green, blue, and/or a combination thereof. The LED may be, for example, an organic light emitting diode, an inorganic light emitting diode, a quantum dot light emitting diode, a micro light emitting diode, and/or a perovskite light emitting diode, but is not limited thereto.

For example, referring to FIG. 8, the unit element 130 may be a light emitting diode, and may include an anode 131; a cathode 132; a light emitting layer 133 between the anode 131 and the cathode 132, and optionally auxiliary layers 134*a*, and 134*b* between the anode 131 and the light emitting layer 133 and/or between the cathode 132 and the light emitting layer 133.

At least one of the anode 131 or the cathode 132 may be a light-transmitting electrode. For example, in at least some embodiments, the anode 131 may be a light-transmitting electrode and the cathode 132 may be a reflective electrode, or the anode 131 may be a reflective electrode and the cathode 132 may be a light-transmitting electrode. In at least some embodiments, the anode 131 and the cathode 132 may each be a light-transmitting electrode.

The light emitting layer 133 may be configured to emit light in a red wavelength spectrum, a green wavelength spectrum, a blue wavelength spectrum, an infrared wavelength spectrum, an ultraviolet wavelength spectrum, or a combination thereof, and may include, for example, an organic light emitting layer, an inorganic light emitting layer, an organic/inorganic light emitting layer, or any combination thereof. The light emitting layer 133 may include at least one host material and/or at least one dopant.

The auxiliary layers 134*a* and 134*b* may be, for example, charge auxiliary layers, and may be, for example, a hole transport layer, a hole injection layer, an electron blocking layer, an electron transport layer, an electron injection layer, a hole blocking layer, a combination thereof, and/or the like, but are not limited thereto. In at least some embodiments, the unit element 130 may further include a spectrum shifting layer (not shown) selected to shift the spectrum emitted from the light emitting layer 133. For example, the spectrum shifting layer may be configured to shift UV light to blue light. In at least some embodiments, the spectrum shifting layer may be included in at least one of the auxiliary layers 134*a* and/or 134*b*.

Referring back to FIG. 6, the connection wire 140 may electrically connect the first thin film transistor 120*a* in the stretchable region C10 and the second thin film transistor 120*b* and/or the unit element 130 in the stretch-resistant region C20 and may be, for example, disposed on the stretchable region 110-C10 and the stretch-resistant region 110-C20 of the substrate 110. The connection wire 140 may also be disposed between the adjacent unit elements 130 to electrically connect the adjacent unit elements 130. The connection wire 140 may be one, two, or more, and may be arranged in a row direction (e.g., D1 (or D2) direction) and column direction (e.g., D2 (or D1) direction) between the unit elements 130 arranged along rows and/or columns. The connection wire 140 may be connected to a signal line (not shown). The signal line may include, for example, a gate line transmitting a gate signal (or a scan signal), a data line transmitting a data signal, a driving voltage line applying a driving voltage, and/or a common voltage line applying a common voltage but are not limited thereto.

The connection wire 140 may include, for example, a low-resistance conductor, for example, silver, gold, copper, aluminum, an alloy thereof, and/or the like. The connection wire 140 may be, for example, a stretchable wire. In at least some embodiments, the connection wire 140 may be omitted.

The non-deformation section NC of the flexible display panel 100 may be an area excluding the aforementioned deformation section C, and may be, for example, a flat portion in the case of a foldable display panel. The non-deformation section NC of the flexible display panel 100 includes a plurality of pixel circuits 120 and a plurality of unit elements 130, and optionally a connection wire 140 that are repeatedly arranged on the substrate 110, like the aforementioned deformation section C.

Unlike the deformation section C, the non-deformation section NC of the flexible display panel 100 may not include a separate stretchable region C10 and may include only the stretch-resistant region C20. Accordingly, the substrate 110 of the non-deformation section NC of the flexible display panel 100 may include a non-stretchable material having a relatively high elastic modulus, for example, polycarbonate, polymethyl methacrylate, polyethylene terephthalate, polyethylene naphthalate, polyimide, polyamide, polyamideimide, polyethersulfone, a combination thereof, and/or the like. For example, the substrate 110 of the non-deformation section NC of the flexible display panel 100 may be a laminate of the aforementioned stretchable substrate 110*a* and the flexible substrate 110*b*. The flexible substrate 110*b* may be over the entire non-deformation section NC and the substrate 110 may exhibit non-stretchability by the high elastic modulus of the flexible substrate 110*b*.

In the non-deformation section NC of the flexible display panel 100, the plurality of pixel circuits 120 and the plurality of unit elements 130 may be arranged on the stretch-resistant region C20 of the substrate 110 and may be placed in each pixel or subpixel PX. The plurality of pixel circuits 120 may include a plurality of thin film transistors including a switching thin film transistor and a driving thin film transistor and a capacitor. Each of semiconductor layers of the switching thin film transistor and the driving thin film transistor may include, for example, silicon, an oxide semiconductor, an organic semiconductor, or any combination thereof, and may include, for example, a non-stretchable semiconductor layer. The plurality of unit elements 130 may include light emitting diodes as described above, and the specific details are the same as described above.

As described above, by disposing the stretchable region C10 in a deformation section C such as a folding section, a bending section, or a rolling section, the flexible display panel 100, according to the present embodiment, may effectively reduce the stress applied when repeatedly folded, bent, or rolled to reduce or prevent damage in the deformation section C of the flexible display panel 100, while maintaining stable electrical characteristics. In addition, by reducing the stress applied in the deformation section C as described above, a foldable, bendable, or rollable display panel having a small curvature may be implemented, for example, a foldable or rollable display panel having a curvature of less than about 1 mm, less than or equal to about 0.8 mm, less than or equal to about 0.5 mm, or less than or equal to about 0.3 mm, less than or equal to about 0.2 mm, or less than or equal to about 0.1 mm may be implemented.

In addition, by dispersing and distributing a portion of the pixel circuit (e.g., at least a portion of the thin film transistor) that is generally all disposed in the pixel in the stretchable region C10 in the deformation section C, the size of the pixel may be effectively reduced, and accordingly, it is possible to overcome the limitation of the pixel arrangement space (e.g., due to the stretchable region C10 in the deformation section C) and the number of pixels per unit area may be increased. For example, the number of pixels per unit area in the deformation section C may be greater than or equal to about 150 ppi (pixel per inch), greater than or equal to about 200 ppi, greater than or equal to about 250 ppi, greater than or equal to about 300 ppi, greater than or equal to about 350 ppi, greater than or equal to about 400 ppi, greater than or equal to about 450 ppi, or greater than or equal to about 500 ppi and for example, about 150 ppi to about 1000 ppi, about 200 ppi to about 1000 ppi, about 250 ppi to about 1000 ppi, about 300 ppi to about 1000 ppi, about 350 ppi to 1000 ppi, about 400 ppi to 1000 ppi, about 450 ppi to about 1000 ppi, and/or about 500 ppi to about 1000 ppi. Accordingly, the deformation section C of the flexible display panel 100 may implement substantially the same resolution as the non-deformation section NC, and in the deformable section C, such as a folding section, a bending section, or a rolling section, of the flexible display panel 100, a uniform display quality may be implemented over the entire screen without degradation of image quality.

In addition, by disposing the channel length direction of the first thin film transistor 120*a* in the stretchable region C10 of the deformation section C of the flexible display panel 100 substantially parallel to the first direction D1, which is a direction of the axis along which the flexible display panel 100 is folded, bent, or rolled, and substantially perpendicular to the second direction D2, which is a direction of the stress applied to the deformation section C of the flexible display panel 100, to reduce the effect on the channel length of the thin film transistor and thus change in the current characteristics of the thin film transistor, when the flexible display panel 100 is folded, bent, or rolled, stable electrical characteristics may be secured, and accordingly, the deterioration of display quality in the deformation section C may be effectively reduced and/or prevented.

Hereinafter, an example of a flexible display panel 100 according to some example embodiments will be described.

Figure 9:
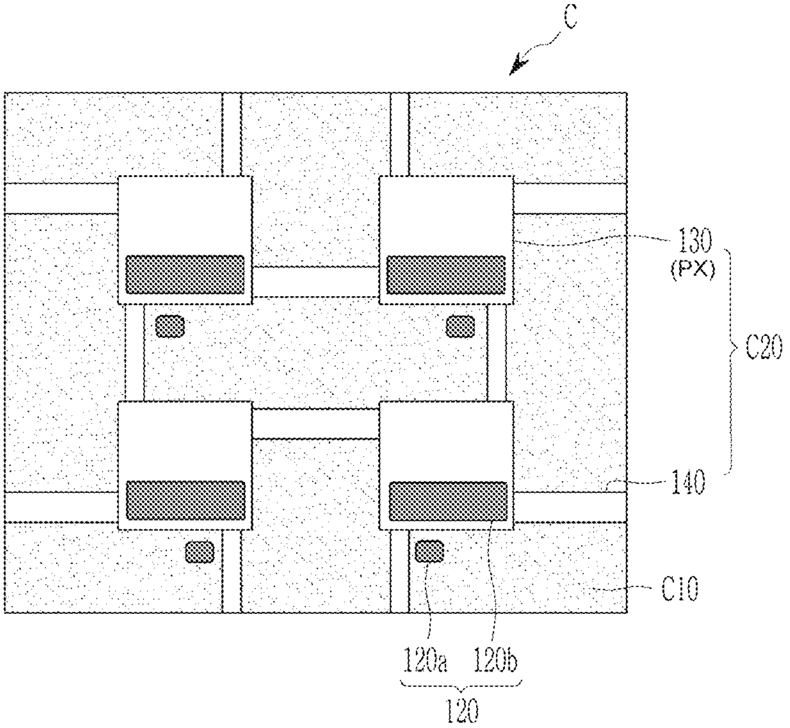
FIG. 9 is an enlarged plan view of a deformation section C according to an example of a flexible display panel according to some example embodiments.
Figure 10A:
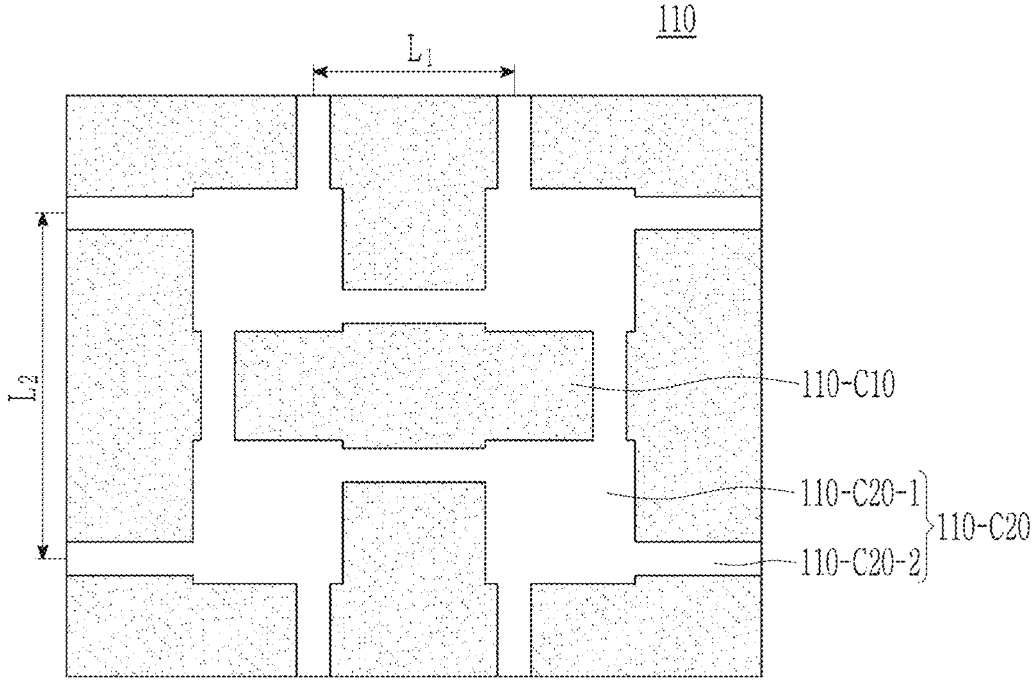
FIG. 10A is a plan view showing an example of the substrate in the deformation section C of FIG. 9.
Figure 10B:
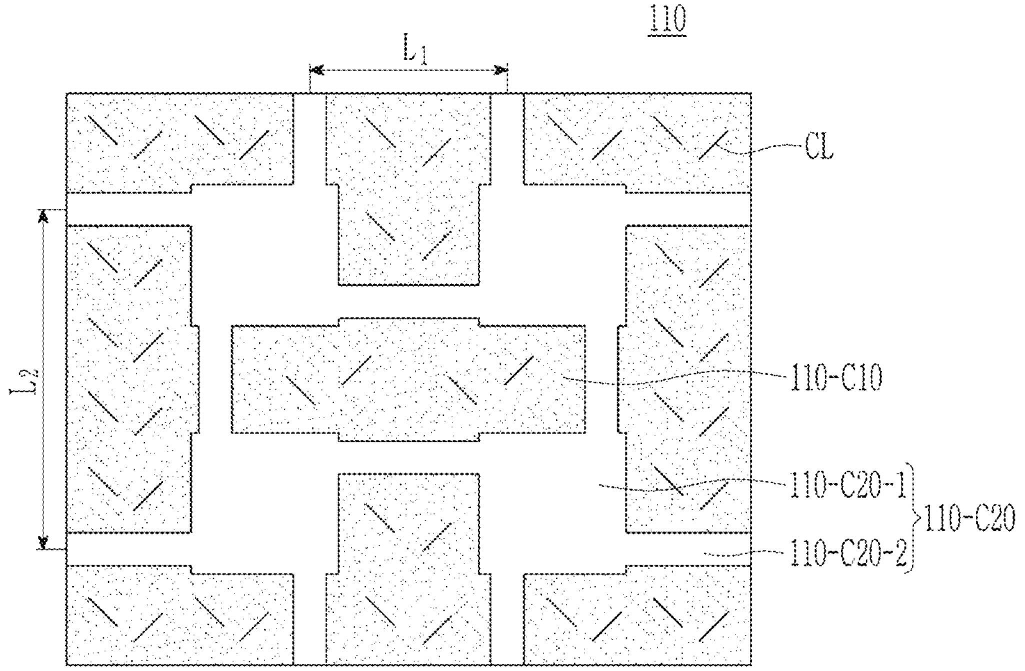
FIG. 10B is an example region of a stretchable region 110-C10 of FIG. 10A.

FIG. 9 is an enlarged plan view of a deformation section C, according to another example of a flexible display panel and FIG. 10 is a plan view showing an example of the substrate in the deformation section C of FIG. 9, and FIG. 10B is an example region of a stretchable region 110-C10 of FIG. 10A.

Referring to FIG. 9, the deformation section C of the flexible display panel 100, as described in the aforementioned embodiment, includes the substrate 110, the pixel circuit 120, the unit element 130, and the connection wire 140.

A plurality of the pixel circuits 120 are repeatedly arranged on the substrate 110. Each pixel circuit 120 may include elements configured to independently control and/or drive each pixel (or subpixel), for example, a plurality of thin film transistors and capacitors. The plurality of thin film transistors may include, for example, at least one switching thin film transistor and at least one driving thin film transistor. A first thin film transistor 120*a*, which is at least a portion of the plurality of thin film transistors in each pixel circuit 120, may be in the stretchable region C10, and a second thin film transistor 120*b*, which is at least of the plurality of thin film transistors, and a capacitor (not shown) may be in the stretch-resistant region C20. The first and second thin film transistors 120*a* and 120*b* are the same as described above. The unit element 130 is in the stretch-resistant region C20, and each unit element 130 may define each pixel PX (or subpixel) of the flexible display panel 100. Each unit element 130 may be, for example, a light emitting diode. Detailed descriptions of the pixel circuit 120, the unit element 130, and the connection wire 140 are the same as described above, and therefore a repeat description is omitted for brevity.

Referring to FIGS. 10A and 10B, the substrate 110 in the deformation section C of the flexible display panel 100 may include the stretchable region 110-C10 and the stretch-resistant region 110-C20. The stretchable region 110-C10 may have an island shape surrounded by the stretch-resistant region 110-C20. The stretch-resistant region 110-C20 may connect an island-shaped region 110-C20-1 where the unit element 130 is disposed to the adjacent island-shaped region 110-C20-1 and include a connection region 110-C20-2 where the connection wire 140 is disposed.

In the stretchable region 110-OC10 of the substrate 110, a plurality of cut lines (incision lines, shown in FIG. 10B), which are configured to be deformed by an external force, may be formed. The cut lines, when the flexible display panel 100 is folded, bent, or rolled, may be geometrically deformed, while widened or twisted, thereby providing extensibility to the deformation section C of the substrate 110. The plurality of cut lines may have shapes, positions, and/or sizes determined through geometrical pre-calculation in consideration of the direction of the stress applied to the substrate 110, arrangement of the unit element 130, and the like. The plurality of cut lines may be repeatedly disposed in the deformation section C of the substrate 110 and thus cause repeated geometrical deformation, when the stress is applied in a predetermined (or otherwise determined) direction (e.g., second direction D2). Such a structure may also be called "Kirigami structure", and the cut line and adjacent patterns (cut patterns) divided by the cut lines may be spread, stretched, or twisted, and accordingly, a separation distance between adjacent patterns (cut patterns) may be changed according to the presence or absence of stretching or the strength of stretching. For example, the separation distances L1 and L2 between the adjacent connection regions 110-C20-2 may be changed according to the presence or absence of stretching or the strength of stretching. Due to the two-dimensional and/or three-dimensional structural deformation, stretching and restoration in the stress direction may be easy, so that effective stretchability may be provided to the stretchable region 110-C10 of the substrate 110. Detailed descriptions of materials of the stretchable region 110-C10 and the stretch-resistant region 110-C20 of the substrate 110 are the same as described above, and therefore repeat descriptions are omitted.

FIGS. 9 and 10 show the island-shape example that the stretchable region C10 (the stretchable region 110-C10 of the substrate 110) is surrounded with the stretch-resistant region C20 (the stretch-resistant region 110-C20 of the substrate 110), but the present disclosure is not limited thereto, and the stretchable region C10 (the stretchable region 110-C10 of the substrate 110) may have a stripe shape or other various shapes.

The aforementioned flexible display panel 100 may be a foldable display panel, a bendable display panel, or a rollable display panel but the example embodiments are not limited thereto and may be applied to any display panel requiring flexibility.

The aforementioned flexible display panel 100 may be included in various electronic devices such as a display device. The electronic device may be, for example, applied to mobile phones, video phones, smart phones, smart pads, smart watches, digital cameras, tablet PCs, laptop PCs, notebook computers, computer monitors, wearable computers, televisions, digital broadcasting terminals, e-books, personal digital assistants (PDAs), PMP (portable multimedia player), EDA (enterprise digital assistant), head mounted display (HMD), in-vehicle navigation, Internet of Things (IoT), Internet of Everything (IoE), security devices, medical devices, or automotive electronic parts, but is not limited thereto.

Hereinafter, the embodiments are illustrated in more detail with reference to examples. However, these are only examples, and the scope of claims is not limited thereto.

Example: Manufacture of Stretchable Thin Film Transistor

Gold (Au) is thermally deposited on a styrene-ethylene-butylene-styrene (SEBS) substrate to form a gate electrode, and a SEBS solution is coated thereon and annealed at 100° C. for 0.5 hours to form a gate insulating layer. An organic semiconductor represented by Chemical Formula A and SEBS (elastomer) in a weight ratio of 3:7 is mixed at a concentration of 0.6 wt % in chlorobenzene to prepare an organic semiconductor solution, and the organic semiconductor solution is spin-coated at 1000 rpm on the gate insulating layer to be 1000 Å thick and heat-treated under a nitrogen atmosphere at 100° C. for 1 hour to form an organic semiconductor layer. On the organic semiconductor layer, Au is thermally deposited to form a source electrode and a drain electrode to manufacture a stretchable thin film transistor. The stretchable thin film transistor has a width/length ratio of 25/10.

<Chemical Formula A>

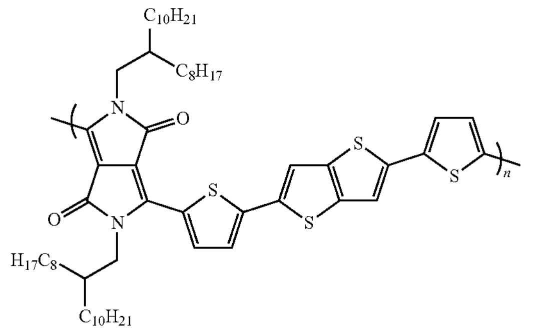

Example and Comparative Example

The stretchable thin film transistor according to Preparation Example is stretched (stretching rate: 0 to 50%) in a second direction (D2) perpendicular to the source electrode-drain electrode direction (channel length direction, first direction D1) to evaluate electrical characteristics (Example). Herein, the stretching rate refers to a length variation ratio to an initial length, and the stretching direction is a stress direction.

In addition, the stretchable thin film transistor according to Preparation Example is evaluated with respect to electrical characteristics, while stretched (stretching rate: 0 to 50%) in the source electrode-drain electrode direction (channel length direction, first direction D1) (Comparative Example).

Figure 11:
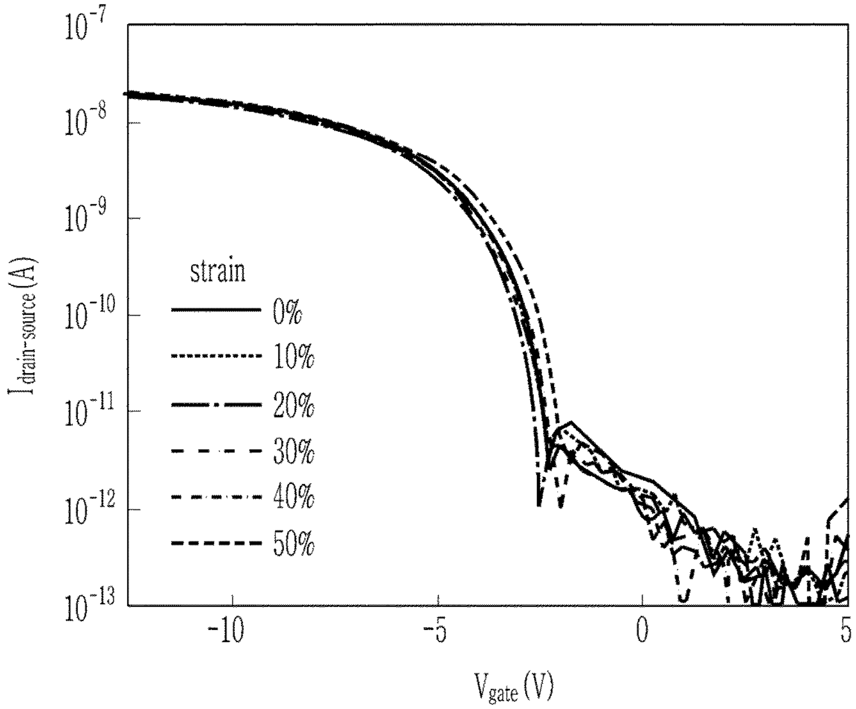
FIG. 11 is a graph showing electrical characteristics according to stretching of the stretchable thin film transistor according to the example.
Figure 12:
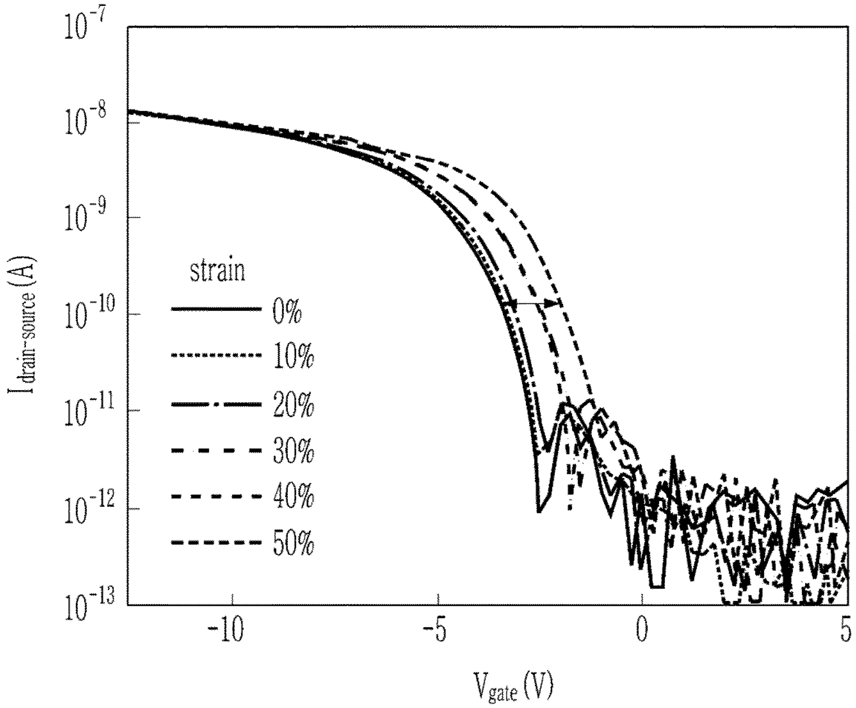
FIG. 12 is a graph showing electrical characteristics according to stretching of the stretchable thin film transistor according to the comparative example.

FIG. 11 is a graph showing electrical characteristics depending on stretching of the stretchable thin film transistor, according to Example and FIG. 12 is a graph showing electrical characteristics depending on stretching of the stretchable thin film transistor according to Comparative Example.

Referring to FIGS. 11 and 12, the stretchable thin film transistor according to Example, wherein the channel length direction is perpendicular to the stretching direction (stress direction), exhibits almost no electrical characteristic change, but the stretchable thin film transistor according to Comparative Example, wherein the channel length direction is parallel to the stretching direction (stress direction), exhibits large electrical characteristic change, as the stretching rate increases.

Accordingly, electrical stability of the stretchable thin film transistor is greatly affected by the stress direction (stretching direction) applied to the stretchable thin film transistor and accordingly, may be increased by substantially vertically disposing the channel length direction of the stretchable thin film transistor perpendicular to the stress direction in a flexible display panel where stress is repeatedly applied in a predetermined direction.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A flexible display panel configured to be at least one of foldable, bendable, or rollable along at least one axis extending in a first direction comprising:

a substrate comprising at least one stretchable region and at least one stretch-resistant region;

a plurality of pixel circuits repeatedly arranged on the substrate, each of the plurality of pixel circuits comprising a plurality of thin film transistors, and each of the plurality of thin film transistors comprising a first thin film transistor comprising a stretchable semiconductor layer, the stretchable semiconductor layer on the at least one stretchable region of the substrate;

a light emitting element array comprising light emitting elements repeatedly arranged on the at least one stretch-resistant region of the substrate and electrically connected to a corresponding pixel circuit of the plurality of pixel circuits; and connection wires extending between the at least one stretchable region and the at least one stretch-resistant region, the connection wires electrically connecting the light emitting elements and the first thin film transistors, wherein a channel length direction of the first thin film transistor is substantially parallel to the first direction.

2. The flexible display panel of claim 1, wherein the light emitting elements are on the at least one stretch-resistant region of the substrate and comprises light emitting diodes.

3. The flexible display panel of claim 1, wherein each of the plurality of thin film transistors further comprise a second thin film transistor on the at least one stretch-resistant region of the substrate, and the second thin film transistor comprises a non-stretchable semiconductor layer.

4. The flexible display panel of claim 3, wherein the first thin film transistors are a witching thin film transistors, and the second thin film transistors are driving thin film transistors.

5. The flexible display panel of claim 3, wherein the stretchable semiconductor layer comprises at least one of an organic semiconductor or an oxide semiconductor, and the non-stretchable semiconductor layer comprises at least one of an elemental semiconductor or an oxide semiconductor.

6. The flexible display panel of claim 1, wherein the flexible display panel comprises a deformation section in which the flexible display panel is foldable, bendable, rollable, or a combination thereof along the at least one axis and a non-deformation section excluding the deformation section, and the deformation section comprises the at least one stretchable region and the at least one stretch-resistant region.

7. The flexible display panel of claim 6, wherein in the deformation section, the at least one stretchable region and the at least one stretch-resistant region of the substrate are alternately disposed along the first direction.

8. The flexible display panel of claim 6, wherein in the non-deformation section, the substrate does not include the at least one stretchable region.

9. The flexible display panel of claim 6, wherein the at least one stretchable region has at least one of an island shape or a stripe shape, and the at least one stretch-resistant region includes a region of the substrate excluding the at least one stretchable region.

10. The flexible display panel of claim 6, wherein the at least one stretch-resistant region has at least one of an island shape or a stripe shape, and the at least one stretchable region is a region of the substrate excluding the at least one stretch-resistant region.

11. The flexible display panel of claim 6, wherein the at least one stretchable region of the substrate has a plurality of cut lines that are configured to be deformable by an external force.

12. The flexible display panel of claim 1, wherein the connection wires are stretchable electrodes.

13. A flexible display panel that is foldable, bendable, or rollable along at least one axis extending in a first direction, comprising:

a deformation section in which the flexible display panel is configured to be at least one of foldable, bendable, or rollable along the at least one axis, and a non-deformation section excluding the deformation section, wherein the deformation section comprises a stretchable region, a stretch-resistant region, and connection wires extending between the stretchable region and the stretch-resistant region, the stretchable region comprises a first thin film transistor including a stretchable semiconductor layer, the stretchable semiconductor layer on the stretchable region, the stretch-resistant region comprises a light emitting diode, and the connection wires electrically connecting the light emitting diode and the first thin film transistor.

14. The flexible display panel of claim 13, wherein a channel length direction of the first thin film transistor is substantially parallel to the first direction.

15. The flexible display panel of claim 13, wherein the stretch-resistant region further comprises at least one of a capacitor or a second thin film transistor including a non-stretchable semiconductor layer.

16. The flexible display panel of claim 15, wherein the stretch-resistant region includes the second thin film transistor, the first thin film transistor is a switching thin film transistor, and the second thin film transistor is a driving thin film transistor.

17. The flexible display panel of claim 13, wherein the stretchable region and the stretch-resistant region are alternately disposed in the deformation section along at least one of the first direction or a second direction perpendicular to the first direction.

18. The flexible display panel of claim 13, wherein the connection wires are stretchable electrodes.

19. An electronic device comprising the flexible display panel of claim 1.

20. An electronic device comprising the flexible display panel of claim 13.

* * * * *